United States Patent
Han et al.

(10) Patent No.: US 9,510,253 B2
(45) Date of Patent: Nov. 29, 2016

(54) METHOD AND SYSTEM FOR DETERMINING REASON FOR TOO LATE HANDOVER TO HOME ENB

(75) Inventors: Lifeng Han, Shenzhen (CN); Yin Gao, Shenzhen (CN); Longtao Ren, Shenzhen (CN); Jian Zhang, Shenzhen (CN); Shengyao Jin, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 873 days.

(21) Appl. No.: 13/520,792

(22) PCT Filed: Apr. 26, 2010

(86) PCT No.: PCT/CN2010/072218
§ 371 (c)(1),
(2), (4) Date: Jul. 6, 2012

(87) PCT Pub. No.: WO2011/134138
PCT Pub. Date: Nov. 3, 2011

(65) Prior Publication Data
US 2013/0005330 A1    Jan. 3, 2013

(51) Int. Cl.
*H04W 36/08* (2009.01)
*H04W 36/00* (2009.01)
*H04W 92/20* (2009.01)

(52) U.S. Cl.
CPC ......... *H04W 36/08* (2013.01); *H04W 36/0016* (2013.01); *H04W 36/0055* (2013.01); *H04W 36/0005* (2013.01); *H04W 92/20* (2013.01)

(58) Field of Classification Search
CPC ................... H04W 36/0005; H04W 36/0055; H04W 36/0016
USPC ........................................................ 455/424
See application file for complete search history.

(56) References Cited

U.S. PATENT DOCUMENTS 8,401,551 B2 * 3/2013 Bishop et al. ............. 455/435.1
8,886,200 B2 * 11/2014 Gogic ............... H04W 36/0083
                                                            370/321

(Continued)

FOREIGN PATENT DOCUMENTS

| CN | 101635942 A | 1/2010 |
|----|-------------|--------|
| WO | 2008086460 A2 | 7/2008 |
| WO | 2010017961 A1 | 2/2010 |

OTHER PUBLICATIONS

International Search Report in international application No. PCT/CN2010/072218, mailed on Jan. 20, 2011.

(Continued)

*Primary Examiner* — Asghar Bilgrami
(74) *Attorney, Agent, or Firm* — Oppedahl Patent Law Firm LLC

(57) ABSTRACT

The present disclosure provides a method for determining a reason for too late handover to a Home eNB (HeNB), and the method includes that: after completing the re-establishment link of Radio. Resource Control (RRC) with User Equipment (UE), the HeNB confirms that a Radio Link Failure (RLF) event occurs when the UE is connected with a cell of another eNodeB; the HeNB generates an RLF Indication message and transmits the RLF Indication message to the another eNodeB, wherein the RLF Indication message includes information of a Closed Subscriber Group (CSG) cell currently accessed by the UE; the another eNodeB determines the reason for too late handover of the UE to the HeNB according to the RLF Indication message. The disclosure also provides a system for determining the reason for too late handover to the HeNB. The present disclosure can determine a specific reason for the RLF, and thereby, can be more useful for improving the configuration of related parameters at the network side.

20 Claims, 5 Drawing Sheets

(56) References Cited

U.S. PATENT DOCUMENTS

| | | | |
|---|---|---|---|
| 2011/0039557 A1* | 2/2011 | Narasimha | H04W 24/10 455/434 |
| 2011/0242965 A1* | 10/2011 | Strzyz et al. | 370/216 |
| 2011/0250892 A1* | 10/2011 | Gupta et al. | 455/437 |
| 2012/0149362 A1* | 6/2012 | Tooher et al. | 455/423 |
| 2013/0183960 A1* | 7/2013 | Olofsson et al. | 455/423 |
| 2014/0064247 A1* | 3/2014 | Teyeb et al. | 370/331 |

OTHER PUBLICATIONS

English Translation of the Written Opinion of the International Search Authority in international application No. PCT/CN2010/072218, mailed on Jan. 20, 2011.

Evolved Universal Terrestrial-Radio Access Network Sep. 2009.

* cited by examiner

METHOD AND SYSTEM FOR DETERMINING REASON FOR TOO LATE HANDOVER TO HOME ENB

TECHNICAL FIELD

The present disclosure relates to the technology for determining the reason for too late handover, and in particular to a method and system for determining a reason for too late handover to a Home eNB (HeNB).

BACKGROUND

In the description of technical specification 36300-910 of the Evolved Universal Terrestrial Radio Access Network (E-UTRAN), the Long Term Evolution (LTE) network consists of the E-UTRAN Macro Evolved NodeB (Macro eNB), the HeNB, and the Evolved Packet Core (EPC). The HeNB supports three modes for accessing of a user: Closed Subscriber Group (CSG), Hybrid and Open. E-UTRAN comprises the collection of the Macro eNB which is connected with EPC via an S1 interface and the HeNB; the Macro eNBs can be connected via an X2 interface, and the X2 interface may be defined between the HeNBs or between the HeNB and the Macro eNB. S1 and X2 are logic interfaces. One EPC can manage one or more eNBs; one eNB can be controlled by multiple EPCs, and one eNB can manage one or more cells.

Self Organizing Network (SON) is a technology for automatically implementing network configuration and optimization. The characteristic of the technology is automatic configuration and automatic optimization. By applying this technology in LTE, an eNodeB can automatically configure network parameters, and automatically optimize according to a network change, so as to improve network performances and save a great number of manpower and material resources at the same time.

One researching point of SON is Mobility Robustness Optimization (MRO), which is for solving problems of too late handover, too early handover, or handing over to a wrong cell which may be generated when a User Equipment (UE) implements a handover among cells. Too late handover refers to that when a UE triggers a handover or the handover is still not triggered, received signal strength of a source cell is very weak, and thus the UE generates a Radio Link Failure (RLF), wherein the characteristic of too late handover is that the UE has a link failure with the source cell and the UE establishes a connection with another cell after the link failure is generated. Too early handover refers to that a handover is implemented too early and a link failure is generated, wherein the characteristic of too early handover is that the UE establishes a connection with a target cell successfully, the UE has a link failure immediately, and then the UE establishes a connection with the source cell. Handing over to a wrong cell refers to that an incorrect target cell is selected during handover, wherein the characteristic of handing over to a wrong cell is that the UE establishes a connection with a target cell successfully, the UE has a link failure immediately, and then the UE establishes the connection with a third party cell which is neither the source cell nor the target cell.

After the UE re-establishes a connection with a new cell, the eNodeB controlling the new cell sends a RLF Indication message to the eNodeB controlling the source cell, so as to enable the eNodeB controlling the source cell realizing the detection to the above mentioned MRO. At present, the RLF Indication message comprises the following contents: a Physical Cell Identity (PCI) of a cell where the RLF is sent, an E-UTRAN Cell Global Identifier (ECGI) for re-establishing connection with a cell, a Cell Radio Network Temporary Identifier (C-RNTI) of the UE in the source cell, and a short Medium Access Control Integrity protection (short-MAC-I), wherein the shortMAC-I is optional. According to the received RLF Indication, the eNodeB controlling the source cell determines whether the handover is too late or too early, or whether a wrong cell is selected, and notifies an eNodeB re-establishing a connection, so as to optimize handover parameters between cells and improve Robustness of handover on the above basis.

For a handover to a target cell which is CSG or Hybrid (the UE accesses in with a CSG mode, generally named as CSG cell below), the measurement configuration before the handover is different from a handover of which the target cell is a Macro NodeB, the UE needs to trigger a measurement for the CSG cell according to its own fingerprint matching result. For hetero-frequency conditions, the UE can use a Proximity Indication (PI) message to notify the current serving cell to implement corresponding measurement configuration, wherein the PI message comprises an indication of entering into/leaving a range of the CSG cell, and frequency information of the CSG cell. FIG. 1 is a diagram of a RLF scene. As shown in FIG. 1, under such a circumstance, if the UE cannot send the PI message in time, or the PI message is lost, or the frequency information contained in the PI message is different from the frequency used by the CSG cell, the UE cannot be handed over to the corresponding CSG cell in time. As the CSG cell is indoor, when the user enters into the room, the signal of the current serving eNodeB may be too weak to maintain the communication of the UE, thus the above mentioned problem of too late handover can arise. Under such a circumstance, if implementing a normal processing method for the too late handover, unnecessary adjustment for the handover parameters is needed, thereby other problems of handover may be caused. Therefore, E-UTRAN needs to distinguish the specific reasons for generating a too late handover.

SUMMARY

Based on the above, the main purpose of the present disclosure is to provide a method and system for determining a reason for too late handover to a HeNB, so as to determine a specific reason for too late handover to the HeNB.

In order to achieve the purpose, the technical scheme of the present disclosure is realized as follows:

A method for determining a reason for too late handover to HeNB comprises:

after receiving a request message for re-establishing Radio Resource Control (RRC) sent by a UE, the HeNB generates an RLF Indication message, and transmits the RLF Indication message to an eNodeB to which a cell, where the RLF occurs to the UE, belongs, wherein the RLF Indication message includes the information of a CSG cell currently accessed by the UE; and the eNodeB determines the reason for too late handover of the UE to the HeNB according to the received RLF Indication message.

Preferably, the method may further comprise: before the request for re-establishing the RRC to the HeNB is sent, the UE sends a Proximity Indication (PI) message to the eNodeB.

Preferably, the reason for too late handover to the HeNB determined by the eNodeB according to the RLF Indication message may be that: when the eNodeB determines that no measurement configuration is performed on the UE before the UE sends the request for re-establishing the RRC, the eNodeB determines that the reason for too late handover of the UE to the HeNB is that the PI message is not received.

Preferably, the CSG cell information may comprise the frequency information currently used by the CSG cell.

Preferably, the PI message may comprise the frequency information of the CSG cell recorded by the UE; according to the RLF Indication message, the eNodeB determines that the reason for too late handover of the UE to the HeNB is that: the eNodeB compares the frequency information used by the CSG cell which is contained in the CSG cell information with the frequency information used by the CSG cell which is reported by the UE; if a comparison result shows that the two frequencies are inconsistent, the reason for too late handover of the UE to the HeNB can be determined as wrong measurement frequency configured to the UE.

Preferably, the CSG cell information may comprise at least one of the following: identification information of the CSG cell, indication information of accessing with the CSG mode, Tracking Area Code (TAC) information of the CSG cell, and Public Land Mobile-communication Network (PLMN) information of the CSG cell.

A system for determining a reason for too late handover to a HeNB comprises: a HeNB and the UE, and the system further comprises a receiving unit, a generating unit and a determining unit; wherein the receiving unit and the generating unit are arranged in the HeNB, wherein the receiving unit is configured to receive a request message for re-establishing a RRC sent by the UE;

the generating unit is configured to generate a RLF Indication message after the receiving unit receives the request message for re-establishing the RRC, and send the RLF Indication message to an eNodeB to which a cell, where the RLF occurs to the UE, belongs, wherein the RLF Indication message comprises information of a CSG cell currently accessed by the UE; and the determining unit is arranged in the eNodeB to which the cell, where the RLF occurs to the UE, belongs, and is configured to determine the reason for too late handover of the UE to the HeNB according to the RLF Indication message.

Preferably, the system may further comprise: a sending unit, arranged in the UE and configured to send the request message for re-establishing the RRC to the HeNB and send a Proximity Indication (PI) message to the eNodeB to which the cell, where the RLF occurs to the UE, belongs before the request for re-establishing the RRC is sent.

Preferably, the determining unit may further determine that the reason for too late handover of the UE to the HeNB is that the PI message is not received, when no measurement configuration is performed on the UE before the UE sends the request for re-establishing the RRC.

Preferably, the CSG cell information may comprise frequency information currently used by the CSG cell.

Preferably, the PI message may comprise the frequency information of the CSG cell recorded by the UE; the determining unit further compares the frequency information used by the CSG cell which is contained in the CSG cell information with the frequency information used by the CSG cell which is reported by the UE, if the comparison result shows that the two frequencies are inconsistent, the reason for too late handover of the UE to the HeNB can be determined as wrong measurement frequency configured to the UE.

Preferably, the CSG cell information may comprise at least one of the following: identification information of the CSG cell, indication information of accessing with the CSG mode, TAO information of the CSG cell, and PLMN information of the CSG cell.

In the present disclosure, after the UE is accessed into the CSG cell via the RRC re-establishment link, the HeNB to which the CSG cell belongs will be inserted with information such as the frequency information currently used by the CSG cell when generating the RLF Indication message sent to the RLF cell. Thus, after receiving the RLF Indication message sent by the HeNB, the eNodeB to which the RLF cell belongs can determine a specific reason for generating RLF, and thereby it can be more useful for improving related parameter configuration at the network side.

DETAILED DESCRIPTION

In the present disclosure, in order to make the description more convenient, the following scene is adopted for describing technical schemes of the disclosure: two adjacent cells are respectively considered as cell A and cell B; eNodeB A represents the control eNodeB of the cell A and eNodeB B represents the control eNodeB of the cell B. The cell A can be a normal cell or a CSG cell; the cell B is a CSG cell; the UE can access the cell B with a CSG mode.

Embodiment I

Figure 2:
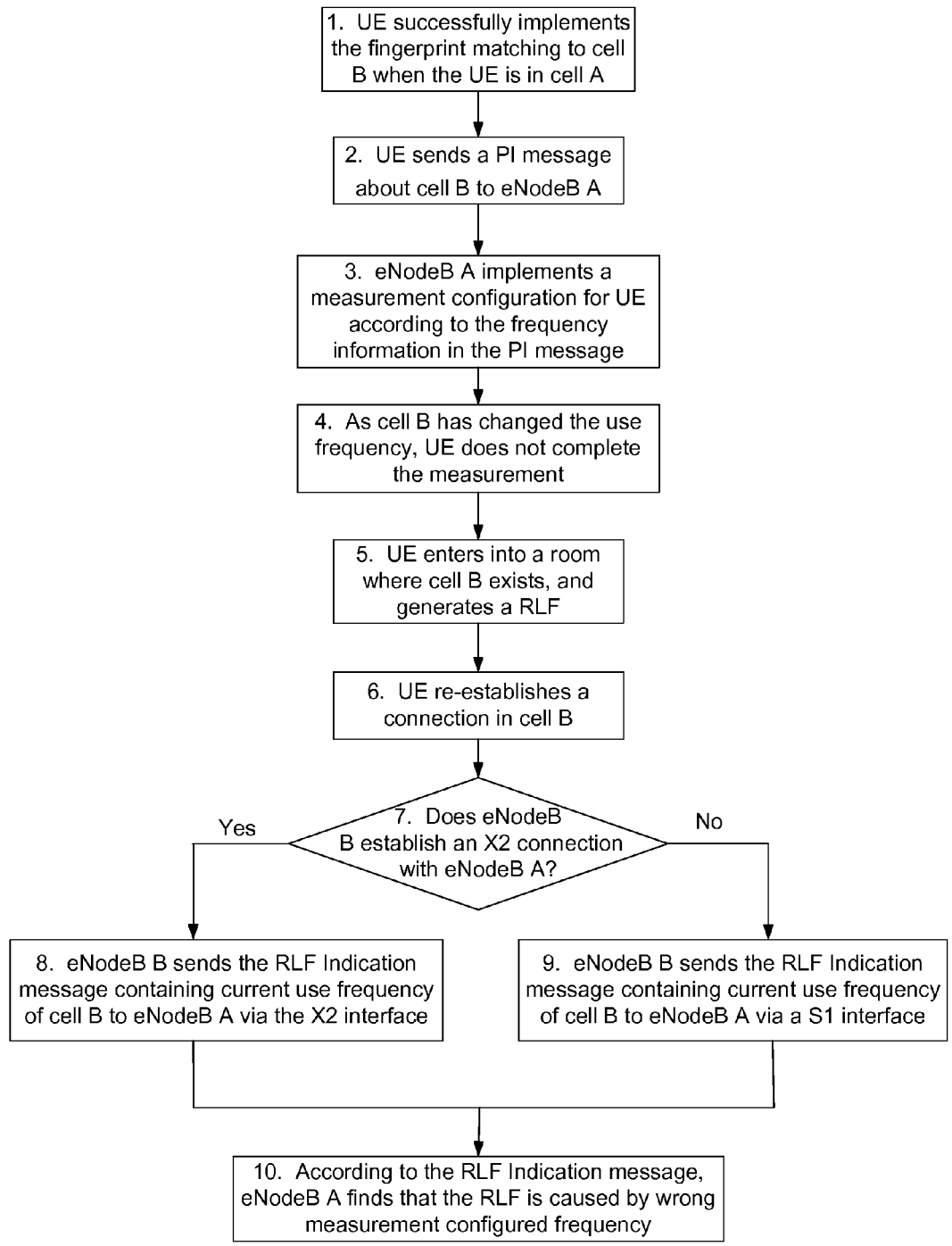
FIG. 2 shows a flowchart of embodiment I of a method for determining a reason for too late handover to a HeNB of the present disclosure.
Figure 3:
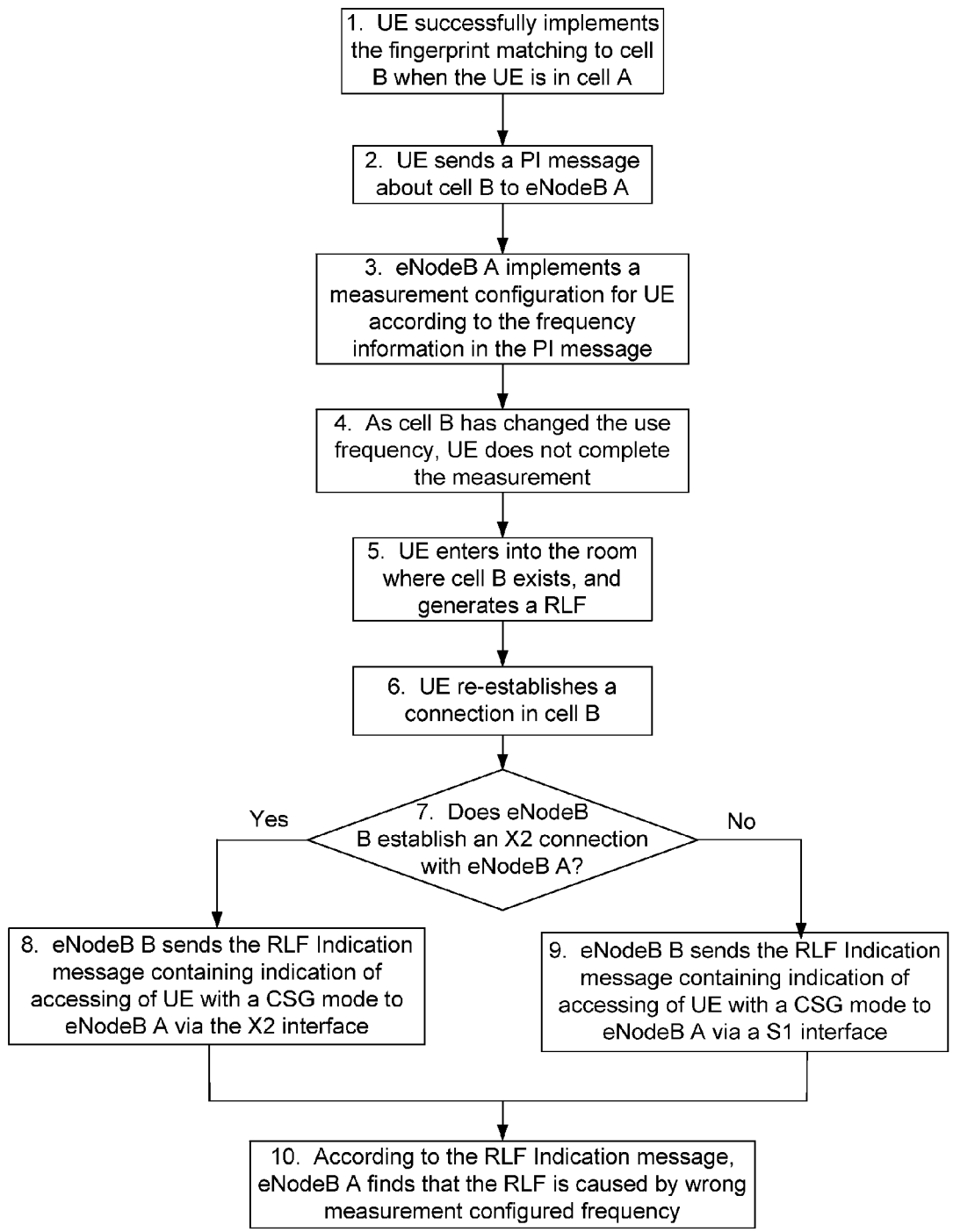
FIG. 3 shows a flowchart of embodiment II of a method for determining a reason for too late handover to a HeNB of the present disclosure.
Figure 4:
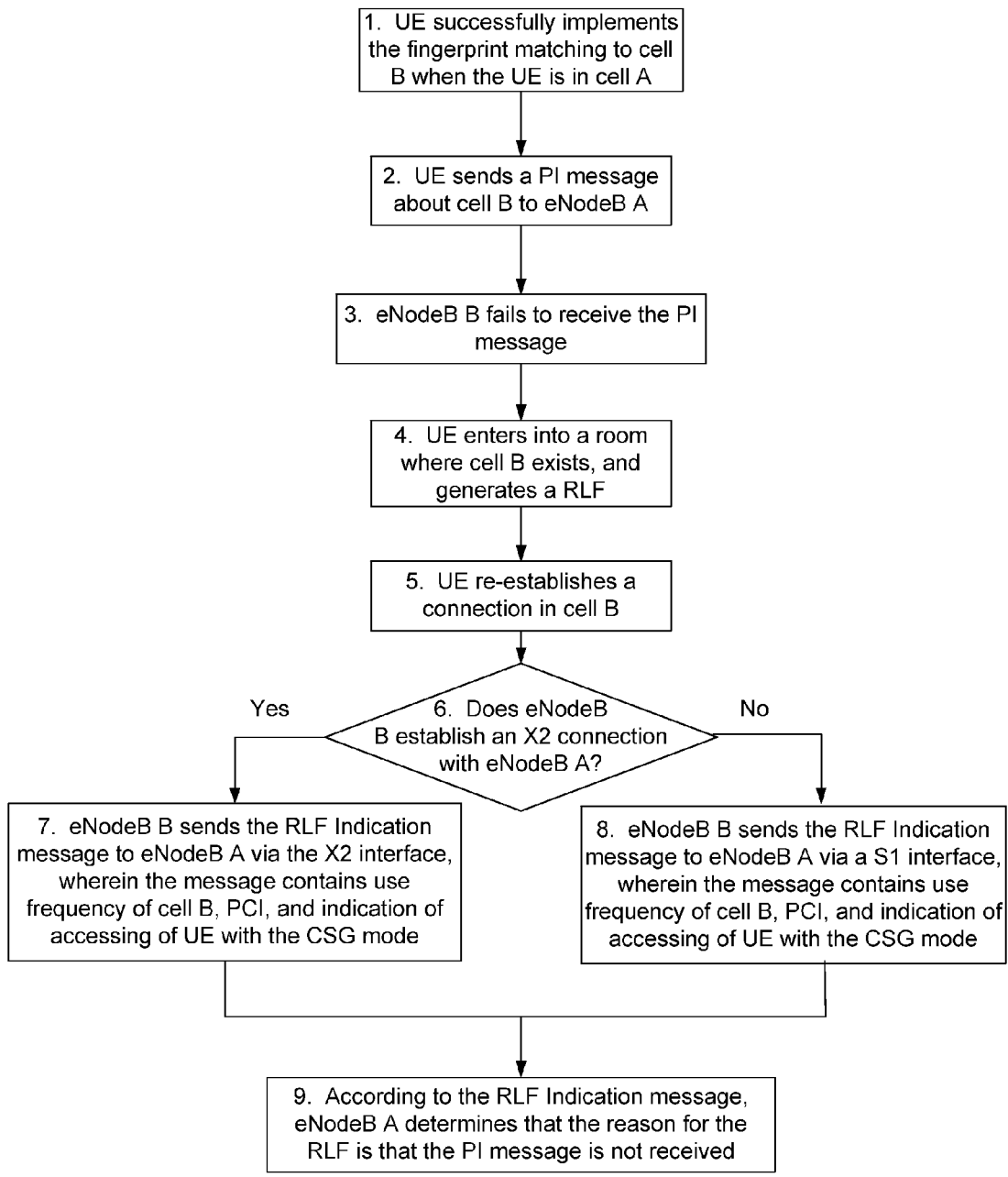
FIG. 4 shows a flowchart of embodiment III of a method for determining a reason for too late handover to a HeNB of the present disclosure.

FIG. 2 is a flowchart of embodiment I of a method for determining a reason for too late handover to a HeNB of the present disclosure; as shown in FIG. 2, the method for determining the reason for too late handover to the HeNB of this embodiment comprises the following steps:

Step 1: the UE successfully implements the fingerprint matching to the cell B when the UE moves from the cell A to the cell B, wherein the cell B is the CSG cell which can be accessed by the UE. Here, as the fingerprint matching is conventional art, it is not the key point of the technical scheme of the disclosure, thus it is omitted here, the specific realization of the fingerprint matching can refer to specifications in the relevant agreements of the HeNB cells.

Step 2: the UE sends a PI message about the cell B to the eNodeB A, wherein the PI message comprises the frequency information of the cell B recorded by the UE.

Step 3: after receiving the PI information, the eNodeB A implements measurement configuration for the UE according to the frequency information in the PI message.

Step 4: as the cell B has changed the use frequency, the UE cannot complete a normal measurement and thereby cannot be handed over to the cell B in time.

Step 5: the UE enters into the coverage of the cell B, and cannot maintain the communication with the cell A, and thus the UE generates a RLF.

Step 6: the UE selects the cell B to try a re-establishment of RRC connection after a cell selection process, and sends a request message for re-establishing to the eNodeB B; the eNodeB B determines that the UE has the RLF event when the UE connects with the cell A according to received request message for re-establishing, and then sends a RLF Indication message to the cell A.

Step 7: the eNodeB B determines whether an X2 connection with the eNodeB A is established; and if yes, turning to Step 8, if not, turning to Step 9.

Step 8: the RLF Indication message sent to the eNodeB A by the eNodeB B via the X2 interface comprises the following contents: a PCI for sending the RLF in the cell A, an ECGI for re-establishing connection with cell B, a C-RNTI of the UE in the source cell A, and a shortMAC-I of the UE in the source cell A and the like. RLF Indication message also comprises CSG cell information for re-establishing connection with cell B. The CSG cell information comprises one or more of the following specific information: frequency information used by the CSG cell (namely, Evolved Absolute Radio Frequency Channel Number (EARFCN)), PCI of the CSG cell, indication of accessing to the CSG cell, Tracking Area Code (TAC) of the CSG cell, PLMN of the CSG cell and the like. The indication of accessing with the CSG mode represents an indication whether the UE re-establishing the RRC connection is accessed in with a CSG mode. The shortMAC-I is optional rather than absolutely contained.

Step 9: if the eNodeB B has no X2 connection with the eNodeB A, the eNodeB B sends the RLF Indication message to the eNodeB A via a S1 interface, wherein contents of the message are the same as that of the RLF Indication message in Step 8.

Step 10: according to received RLF Indication message, and the use frequency EARFCN information of the cell B in the CSG cell information, and the frequency information of the cell B in the PI message received in Step 3, the eNodeB A determines that the two frequencies are inconsistent, and then determines that the reason for the current RLF is wrong measurement frequency configured to the UE, rather than unreasonable configuration for handover parameters among the cells, so as to prevent wrong adjustment to the handover parameters. The eNodeB A can also notify this message to an Operation Administration and Maintenance (OAM) system, wherein the OAM system can optimize, for example, the relevant coverage and the like.

Embodiment II

Step 1: the UE successfully implements the fingerprint matching to the cell B when the UE moves from the cell A to the cell B, wherein the cell B is the CSG cell which can be accessed by the UE.

Step 2: the UE sends a PI message to the eNodeB A, wherein the PI message comprises the frequency information of the cell B recorded by the UE.

Step 3: after receiving the PI information, the eNodeB A implements measurement configuration for the UE according to the frequency information in the PI message.

Step 4: as the cell B has changed the use frequency, the UE cannot complete a normal measurement and thereby cannot be handed over to the cell B in time.

Step 5: the UE enters into a room covered by the cell B, and cannot maintain the communication with the cell A, and thus the UE generates a RLF.

Step 6: the UE selects the cell B to try a re-establishment of RRC connection after a cell selection process, and sends a request message for re-establishing to the eNodeB B; the eNodeB B determines that the UE has the RLF event when the UE connects with the cell A according to received request message for re-establishing, and then sends a RLF Indication message to the cell A.

Step 7: the eNodeB B determines whether an X2 connection with the eNodeB A is established; and if yes, turning to Step 8, if not, turning to Step 9.

Step 8: if the eNodeB B establishes the X2 connection with the eNodeB A, the eNodeB B sends the RLF Indication message to the eNodeB A via the X2 interface, wherein the contents of the RLF Indication message are completely the same as that of Embodiment I.

Step 9: if the eNodeB B has no X2 connection with the eNodeB A, the eNodeB B sends the RLF Indication message to the eNodeB A via a S1 interface, wherein contents of the RLF Indication message are completely the same as that of the Embodiment I.

Step 10: provided that the eNodeB A has known the current use frequency of the cell B (for example, the eNodeB B notifies it to the eNodeB A, or the network side notifies it to the eNodeB A), according to the indication of accessing with the CSG mode in received RLF Indication message, the eNodeB A can determine that the reason for the current RLF is wrong measurement frequency configured to the UE, rather than unreasonable configuration for handover parameters among the cells, so as to prevent wrong adjustment to the handover parameters. The eNodeB A can also notify this message to the OAM system, wherein the OAM system can optimize, for example, the relevant coverage and the like.

Embodiment III

Step 1: the UE successfully implements the fingerprint matching to the cell B when the UE moves from the cell A to the cell B, wherein the cell B is the CSG cell which can be accessed by the UE.

Step 2: the UE sends a PI message to the eNodeB B, or the UE sends no PI message.

Step 3: the eNodeB A fails to receive the PI message, and then cannot implement corresponding measurement configuration to the UE, thus the UE cannot be handed over to the cell B in time.

Step 4: the UE enters into a room covered by the cell B, and cannot maintain the communication with the cell A, and thus the UE generates a RLF.

Step 5: the UE selects the cell B to try a re-establishment of RRC connection after a cell selection process, and sends a request message for re-establishing to the eNodeB B; the eNodeB B determines that the UE has the RLF event when the UE connects with the cell A according to received request message for re-establishing, and then sends a RLF Indication message to the cell A.

Step 6: the eNodeB B determines whether the X2 connection with the eNodeB A is established; and if yes, turning to Step 7, if not, turning to Step 8.

Step 7: if the eNodeB B establishes the X2 connection with the eNodeB A, the eNodeB B sends the RLF Indication message to the eNodeB A via the X2 interface, wherein the RLF Indication message is completely the same as the information contained in Embodiment I.

Step 8: if the eNodeB B has no X2 connection with the eNodeB A, the eNodeB B sends the RLF Indication message to the eNodeB A via a S1 interface, wherein the RLF Indication message is completely the same as the information contained in Embodiment I.

Step 9: according to the received RLF Indication message, the use frequency of the cell B contained in the CSG cell information, PCI, and the indication of the UE accessing with the CSG mode, the eNodeB A determines that the reason for the current RLF is failed reception of the PI message, rather than unreasonable configuration for handover parameters among the cells, so as to prevent wrong adjustment to the handover parameters. The eNodeB A can also notify this message to the OAM system, wherein the OAM system can optimize, for example, the relevant coverage and the like.

In the above Embodiment I to Embodiment III, the eNodeB A can further establish neighbouring cell relationship with the CSG cell, according to the TAO information of the CSG cell and the PLMN information of the CSG cell of the received RLF Indication message.

Here, the indication of accessing with the CSG mode represents an indication whether the UE re-establishing the RRC connection accesses with the CSG mode.

Figure 1:
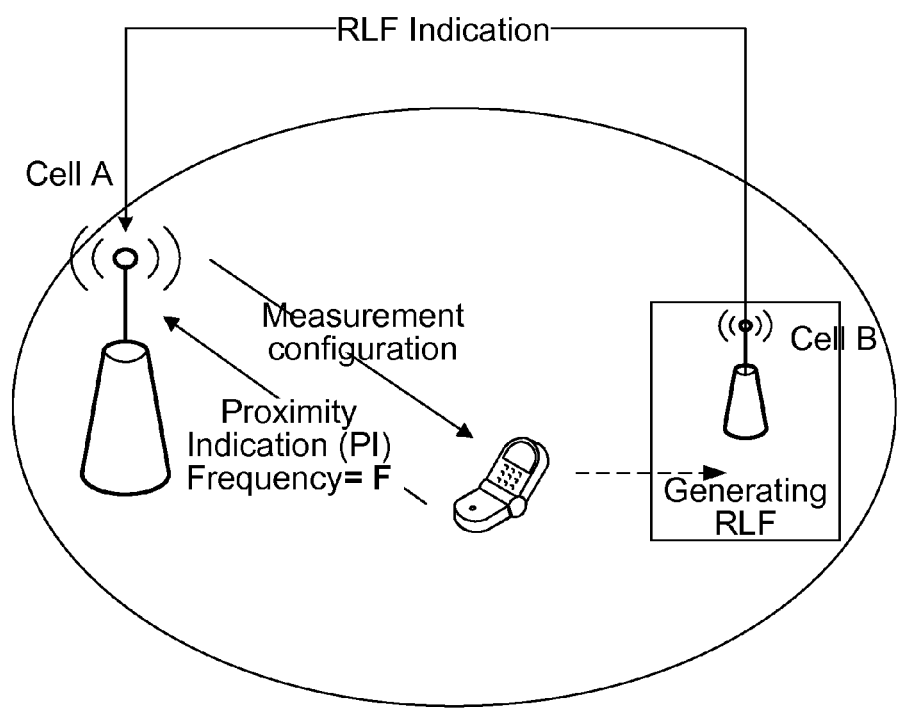
FIG. 1 shows diagram of an RLF scene.

The system for determining the reason for too late handover to the HeNB of the present disclosure comprises a HeNB and a UE, that is, the system comprises relevant network elements in the conventional mobile network, specifically referring to the network structure shown in FIG. 1.

Figure 5:
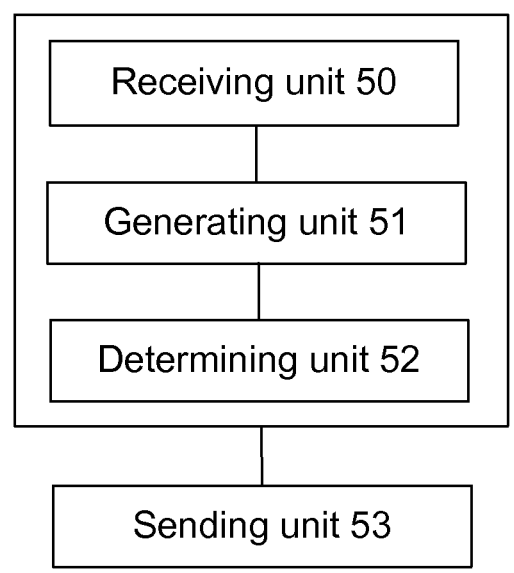
FIG. 5 shows a diagram of a structure of a system for determining a reason for too late handover to a HeNB of the present disclosure.

FIG. 5 is a diagram of a structure of a system for determining the reason for too late handover to the HeNB of the present disclosure. As shown in FIG. 5, the system for determining the reason for too late handover to the HeNB also comprises a receiving unit 50, a generating unit 51 and a determining unit 52, wherein the receiving unit 50 and the generating unit 51 are arranged in the HeNB.

The receiving unit 50 is configured to receive the request message for re-establishing the RRC sent by the UE.

The generating unit 51 is configured to generate the RLF Indication message after the receiving unit 50 receives the request message for re-establishing the RRC, and sends the message to the eNodeB to which the cell for the UE generating the RLF belongs, wherein the RLF Indication message comprises the CSG cell information currently accessed by the UE.

The determining unit 52 is arranged in the eNodeB to which the cell for the UE generating the RLF belongs, and is configured to determine the reason for too late handover to the HeNB of the UE according to the RLF Indication message.

As shown in FIG. 5, the system for determining the reason for too late handover to the HeNB also comprises a sending unit 53, wherein the sending unit 53 is arranged in the UE, and is configured to send the request message for re-establishing the RRC to the HeNB and send the PI message to the eNodeB to which the cell for the UE generating the RLF belongs before the request for re-establishing the RRC being sent.

The determining unit 52 further determines that the reason for too late handover to the HeNB of the UE is that the PI message is not received, when the UE is not implemented with a measurement configuration before the request for re-establishing the RRC being sent.

The CSG cell information comprises frequency information currently used by the CSG cell.

The PI message comprises the frequency information of the CSG cell recorded by the UE.

Furthermore, the determining unit 52 further compares the frequency information contained in the CSG cell information with the frequency information reported by the UE; if the comparison result is that the two frequencies are inconsistent, the reason for too late handover to the HeNB of the UE can be determined as wrong measurement frequency configured to the UE.

The CSG cell information also comprises at least one of the following: the identification information of the CSG cell, the indication information for accessing with the CSG mode, the TAO information of the CSG cell, and the PLMN information of the CSG cell.

Those skilled in the art should understand that the system for determining the reason for too late handover to the HeNB as shown in FIG. 5 is designed for carrying out the method for determining the reason for too late handover to the HeNB; the functions of units of the system shown in FIG. 5 can be realized via programs operated by a processor, and also can be realized via a specific logic circuit.

The above is only the preferred embodiment of the present disclosure and not intended to limit the protection scope of the present disclosure.

What is claimed is:

1. A method for determining a reason for a too late handover to a Home eNB (HeNB), comprising:

after a Radio Link Failure (RLF) occurs to a User Equipment (UE) in a source cell, receiving, by the HeNB, a request for re-establishing a Radio Resource Control (RRC) sent by the UE;

generating, by the HeNB, an RLF Indication message, and transmitting the RLF Indication message to an eNodeB managing the source cell, wherein the RLF Indication message comprises information on a Closed Subscriber Group (CSG) cell currently accessed by the UE; and determining, by the eNodeB, the reason for the too late handover of the UE to the HeNB according to the received RLF Indication message, wherein a too late handover refers to a case that when a UE triggers a handover from a source cell to a target cell or before the handover is even triggered, signal strength of the source cell received by the UE has become so weak that an RLF occurs to the UE in the source cell, and then the UE establishes a connection in the target cell which is a cell other than the source cell.

2. The method according to claim 1, further comprising:

sending, by the UE, a Proximity Indication (PI) message to the eNodeB before the request for re-establishing the RRC is sent to the HeNB.

3. The method according to claim 1, wherein the determining, by the eNodeB, the reason for the too late handover of the UE to the HeNB according to the received RLF Indication message comprises: determining, by the eNodeB, that the reason for the too late handover of the UE to the HeNB is that no Proximity Indication (PI) message is received, when the eNodeB determines that no measurement configuration is performed on the UE before the UE sends the request for re-establishing the RRC.

4. The method according to claim 1, wherein the information on the CSG cell comprises information on a frequency currently used by the CSG cell.

5. The method according to claim 4, wherein the PI message comprises information on a frequency used by the CSG cell as recorded by the UE;

wherein the determining, by the eNodeB, the reason for the too late handover of the UE to the HeNB according to the received RLF Indication message comprises:

comparing, by the eNodeB, the information on the frequency currently used by the CSG cell as comprised in the information on the CSG cell with the information on the frequency used by the CSG cell as reported by the UE; when the two frequencies are inconsistent, determining the reason for the too late handover of the UE to the HeNB as that a wrong measurement frequency has been configured for the UE.

6. The method according to claim 1, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

7. A system for determining a reason for a too late handover to a Home eNB (HeNB), comprising a HeNB and a User Equipment (UE), the system further comprising a receiving unit, a generating unit and a determining unit, wherein the receiving unit and the generating unit are arranged in the HeNB,
the receiving unit is configured to receive a request for re-establishing a Radio Resource Control (RRC) sent by the UE after a Radio Link Failure (RLF) occurs to the UE in a source cell;
the generating unit is configured to generate an RLF Indication message after the receiving unit receives the request for re-establishing the RRC, and transmit the RLF Indication message to an eNodeB managing the source cell, wherein the RLF Indication message comprises information on a Closed Subscriber Group (CSG) cell currently accessed by the UE; and
the determining unit is arranged in the eNodeB, and is configured to determine the reason for the too late handover of the UE to the HeNB according to the received RLF Indication message,
wherein a too late handover refers to a case that when a UE triggers a handover from a source cell to a target cell or before the handover is even triggered, signal strength of the source cell received by the UE has become so weak that an RLF occurs to the UE in the source cell, and then the UE establishes a connection in the target cell which is a cell other than the source cell.

8. The system according to claim 7, further comprising:
a sending unit, arranged in the UE and configured to send a Proximity Indication (PI) message to the eNodeB before sending the request for re-establishing the RRC to the HeNB.

9. The system according to claim 8, wherein the determining unit is further configured to determine that the reason for the too late handover of the UE to the HeNB is that no Proximity Indication (PI) message is received, when determining that no measurement configuration is performed on the UE before the UE sends the request for re-establishing the RRC.

10. The system according to claim 7, wherein the information on the CSG cell comprises information on a frequency currently used by the CSG cell.

11. The system according to claim 10, wherein the PI message comprises information on a frequency used by the CSG cell as recorded by the UE;
wherein the determining unit is further configured to compare the information on the frequency currently used by the CSG cell as comprised in the information on the CSG cell with the information on the frequency used by the CSG cell as reported by the UE; when the two frequencies are inconsistent, determine the reason for the too late handover of the UE to the HeNB as that a wrong measurement frequency has been configured for the UE.

12. The system according to claim 7, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

13. The method according to claim 2, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

14. The method according to claim 3, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

15. The method according to claim 4, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

16. The method according to claim 5, wherein the information on the CSG cell comprises at least one of the following:
information on an identification ofidentification information of the CSG cell, indication of access in a CSG mode, information on a Tracking Area Code (TAC) of the CSG cell, and information on a Public Land Mobile-communication Network (PLMN) of the CSG cell.

17. The system according to claim 8, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

18. The system according to claim 9, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

19. The system according to claim 10, wherein the information on the CSG cell comprises at least one of the following:
information on an identification of the CSG cell, indication of access in a CSG mode, information on a Tracking Area Code (TAC) of the CSG cell, and information on a Public Land Mobile-communication Network (PLMN) of the CSG cell.

20. The system according to claim 11, wherein the information on the CSG cell comprises at least one of the following:

information on an identification of the CSG cell, indication of access in a CSG mode, information on a Tracking Area Code (TAC) of the CSG cell, and information on a Public Land Mobile-communication Network (PLMN) of the CSG cell.

* * * * *